United States Patent
Bartholomew et al.

(10) Patent No.: US 9,914,858 B2
(45) Date of Patent: Mar. 13, 2018

(54) WATER WHITENING-RESISTANT PRESSURE SENSITIVE ADHESIVES

(75) Inventors: Eric L. Bartholomew, Lock Haven, PA (US); Christopher L. Lester, Mill Mall, PA (US); Roger Maerki, Scherzingen (CH); Alfredo Mueller, Zurich (CH); Graham Yeadon, Marbach (CH)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 11/437,253

(22) Filed: May 19, 2006

(65) Prior Publication Data

US 2006/0263600 A1   Nov. 23, 2006

Related U.S. Application Data

(60) Provisional application No. 60/682,973, filed on May 20, 2005, provisional application No. 60/784,867, filed on Mar. 22, 2006.

(51) Int. Cl.
| | |
|---|---|
| *C09J 133/06* | (2006.01) |
| *C08F 220/18* | (2006.01) |
| *C09J 7/02* | (2006.01) |

(52) U.S. Cl.
CPC ........... *C09J 133/06* (2013.01); *C08F 220/18* (2013.01); *C09J 7/0217* (2013.01); *C09J 2203/334* (2013.01); *Y10T 428/2891* (2015.01); *Y10T 428/31935* (2015.04)

(58) Field of Classification Search
CPC ....... C09J 133/06; C09J 7/0217; C08F 220/18
USPC .......................................... 428/343; 507/119
See application file for complete search history.

(56) References Cited

U.S. PATENT DOCUMENTS

| | | | |
|---|---|---|---|
| 4,959,428 A | 9/1990 | Abe et al. | 526/201 |
| 4,994,538 A | 2/1991 | Lee | 526/279 |
| 5,202,375 A | 4/1993 | Biale | 524/562 |
| 5,286,843 A | 2/1994 | Wood | 528/482 |
| 5,316,762 A | 5/1994 | Kiamil | 424/78.35 |
| 5,332,854 A | 7/1994 | Yokota et al. | 558/33 |
| 5,420,195 A | 5/1995 | Mayer et al. | 524/556 |
| 5,852,095 A | 12/1998 | Yamauchi et al. | 524/460 |
| 5,889,101 A | 3/1999 | Schlarb et al. | 524/460 |
| 5,928,783 A | 7/1999 | Phan et al. | 428/355 |
| 6,013,722 A | 1/2000 | Yang et al. | 524/558 |
| 6,121,355 A | 9/2000 | Tsunemine et al. | 524/270 |
| 6,190,767 B1 | 2/2001 | Ishikawa et al. | 428/355 |

(Continued)

FOREIGN PATENT DOCUMENTS

| | | |
|---|---|---|
| EP | 0304788 | 12/1993 |
| EP | 0464454 | 8/1994 |

(Continued)

OTHER PUBLICATIONS

International Search Report dated Sep. 14, 2006 in corresponding Patent Application No. PCT/US06/19563.

(Continued)

*Primary Examiner* — Victor S Chang
(74) *Attorney, Agent, or Firm* — Avery Dennison Corporation (57) ABSTRACT

Water resistant, acrylic emulsion pressure sensitive adhesive polymers containing particles having a mean "volume-average" particle diameter of greater than about 210 nm for use in label and tape application are provided. The emulsion polymers exhibit an increase in opacity of less than about 10%.

33 Claims, 1 Drawing Sheet

(56) References Cited

U.S. PATENT DOCUMENTS

| | | |
|---|---|---|
| 6,239,240 B1 | 5/2001 | Schultz et al. ............... 526/277 |
| 6,359,092 B1 | 3/2002 | Harvey et al. ............... 526/287 |
| 6,489,387 B2 | 12/2002 | Mallya et al. ............... 524/394 |
| 6,518,342 B1 | 2/2003 | Tanaka et al. ............... 524/270 |
| 6,534,590 B1 | 3/2003 | Aso et al. .................... 524/806 |
| 6,706,356 B2 | 3/2004 | Lee ............................. 428/40.1 |
| 6,761,969 B2 | 7/2004 | Li et al. ....................... 428/354 |
| 6,794,434 B2 | 9/2004 | Collins et al. ............... 524/366 |
| 6,890,400 B2 | 5/2005 | Scholz et al. ................ 156/277 |
| 2001/0003765 A1 | 6/2001 | Mallya et al. |
| 2003/0055161 A1 | 3/2003 | Chen et al. .................. 524/801 |
| 2004/0116598 A1 | 6/2004 | Guo et al. .................... 524/804 |
| 2005/0064125 A1 | 3/2005 | Tsukida et al. ............. 428/40.1 |

FOREIGN PATENT DOCUMENTS

| | | |
|---|---|---|
| EP | 0757059 | 12/2002 |
| EP | 0763583 | 2/2003 |
| EP | 1 367 110 A1 | 12/2003 |
| EP | 1 464 656 A1 | 10/2004 |
| WO | 97/11996 A1 | 4/1997 |
| WO | 98/44064 | 10/1998 |
| WO | 00/22016 | 4/2000 |
| WO | 2002/010306 | 2/2002 |

OTHER PUBLICATIONS

International Preliminary Report on Patentability issued in corresponding International Patent Application No. PCT/US2006/019563 dated Jul. 27, 2007.

WATER WHITENING-RESISTANT PRESSURE SENSITIVE ADHESIVES

This application claims the benefit of provisional application Ser. No. 60/682,973 filed on May 20, 2005 and provisional application Ser. No. 60/784,867 filed on Mar. 22, 2006, which are hereby incorporated herein by reference in their entirety.

TECHNICAL FIELD

The subject of the invention is pressure sensitive adhesives and more particularly, acrylic based emulsion pressure sensitive adhesives that, when coated and dried as a film, are clear and resist whitening by the action of water.

BACKGROUND

Clear polymeric labels are increasingly desired, since they provide a no-label look to decorated glass and plastic containers. Paper labels block the visibility of the container and/or the contents in the container. Clear labels enhance the visual aesthetics of the container, and therefore the products, and are growing much faster than paper labels in the package decoration market as consumer product companies are continuously trying to upgrade the appearance of their products on store shelves.

A high degree of resistance to water whitening, especially hot water and/or very cold water, by pressure sensitive adhesives (PSAs) is required for some clear label applications. For example, bottles labeled with clear film PSA labels can be subjected to pasteurization conditions where the label is expected to remain clear throughout the process. In other labeling applications, bottles labeled with clear PSA labels are subjected to long-term submersion in very cold water, such as with beer and beverage bottles. Historically, solvent based adhesives have been used for such demanding applications. Environmental considerations, however, favor elimination of solvents. This and the higher coating speeds attainable with emulsion PSAs favor their use in place of solvent based PSAs.

Emulsion based PSA polymers are made in the presence of surfactants and other water soluble electrolytes such as initiators. In addition, comonomers such as unsaturated carboxylic acids are employed to impart or enhance adhesive properties and tend to be present at the latex-particle interface and remain there during film formation. Films cast from such emulsions are sensitive to water and become cloudy simply when a drop of water is placed on the film. Water whitening is almost always assured when the water is hot, e.g., the temperature of the water is 70° C. or higher.

The water resistance of acrylic emulsion polymer films has long been addressed in the art, particularly with respect to paint films. The art has observed that the presence of water soluble electrolytes, surfactants and polyelectrolytes such as sodium polymethacrylate cause or enhance water sensitivity. It is also known that surfactants are migratory species that with time move toward and bloom to the surface of films, also rendering them water sensitive.

The art has taught that the use of low levels of surfactant, a reduction or elimination in soluble electrolytes and cross-linking between the emulsion particles can all serve to improve or impart water resistance.

SUMMARY

In one embodiment of the invention, a water resistant acrylic pressure sensitive adhesive polymer is formed by polymerizing in emulsion a mixture of monomers comprising at least one alkyl acrylate ester of an alcohol containing 4 to 8 carbon atoms in the alkyl chain; at least one polar monomer; and at least one copolymerizable monomer selected from (a) styrene and styrene derivative monomers or (b) methyl methacrylate, ethyl acrylate, methyl acrylate, vinyl acetate, and combinations of two or more thereof, wherein the monomer of (b) is used with a chain transfer agent. The pressure sensitive adhesive polymer may have a volume average particle diameter of greater than about 210 nm as determined by laser light scattering and exhibits an opacity increase of less than about 10% as determined by the Hot Water Resistance Test described herein. In one embodiment, the PSA polymer exhibits an opacity increase of less than about 5%, and in one embodiment, less than 3%.

In one embodiment, a water resistant acrylic pressure sensitive adhesive polymer is formed by polymerizing in emulsion a mixture of monomers comprising about 55% to about 98% by weight based on the total weight of monomers of at least one alkyl acrylate ester of an alcohol containing 4 to 8 carbon atoms in the alkyl chain; about 0.5% to about 5% by weight based on the total weight of monomers of at least one polar monomer; and about 1% to about 25% by weight based on the total weight of monomers of at least one styrene or styrene derivative copolymerizable monomer, wherein the pressure sensitive adhesive polymer has a volume average particle diameter of greater than about 210 nm as determined by laser light scattering and exhibits an opacity increase of less than about 10% as determined by the Hot Water Resistance Test.

In one embodiment, a water resistant acrylic pressure sensitive adhesive polymer is formed by polymerizing in emulsion a mixture of monomers comprising about 50% to about 99% by weight based on the total weight of monomers of at least one alkyl acrylate ester of an alcohol containing 4 to 8 carbon atoms in the alkyl chain; about 0.5% to about 3% by weight based on the total weight of monomers of at least one polar monomer; about 5% to about 50% by weight based on the total weight of monomers of at least one copolymerizable monomer selected from methyl methacrylate, ethyl acrylate, methyl acrylate, vinyl acetate, and combinations of two or more thereof, about 0.1% to about 0.5% by weight of a chain transfer agent. The pressure sensitive adhesive polymer may have a volume average particle diameter of greater than about 210 nm as determined by laser light scattering and exhibits an opacity increase of less than about 10% as determined by the Hot Water Resistance Test described herein. In one embodiment, the PSA polymer exhibits an opacity increase of less than about 5%.

In addition to exhibiting resistance to water whitening by the action of hot water, the pressure sensitive adhesives may exhibit resistance to water whitening by the action of very cold water. The pressure sensitive adhesives in one embodiment of the invention exhibit an opacity increase of less than about 10% as determined by the Cold Water Resistance Test described herein. In one embodiment, the opacity increase is less than about 5% as determined by the Cold Water Resistance Test.

DETAILED DESCRIPTION

There are provided, in accordance with an embodiment of the present invention, acrylic emulsion pressure sensitive adhesive (PSA) polymer compositions which, when coated and dried as a film, are substantially unaffected by the action water, particularly the action of hot (greater than 65° C.) and very cold (about 0° C.) water.

In addition to providing a no label look to transparent and clear facestocks where the resistance of the adhesive to whitening of water makes the adhesives useful for label applications, resistance to the action of hot water under pasteurization conditions is also desirable. Resistance to very cold water is desirable for application where the labels are subjected to long-term submersion in very cold water, e.g. "ice chest" conditions. The adhesives also have superior "wet stick" adhesive properties.

The water resistant acrylic pressure sensitive adhesive polymer is formed by polymerizing in emulsion a mixture of monomers. In one embodiment, the monomer mixture comprises at least one alkyl acrylate ester of an alcohol containing at least 4 carbon atoms in the alkyl chain; at least one polar monomer; and at least one copolymerizable monomer selected from styrene and styrene derivative monomers. In another embodiment, the monomer mixture comprises at least one alkyl acrylate ester of an alcohol containing at least 4 carbon atoms in the alkyl chain; at least one polar monomer; and at least one copolymerizable monomer chosen from methyl methacrylate, ethyl acrylate, methyl acrylate, vinyl acetate, and combinations of two or more thereof.

The acrylic emulsion PSA polymers are comprised of a predominant amount of one or more alkyl acrylate esters of an alcohol containing at least 4 carbon atoms. In one embodiment, the alkyl acrylate esters contain 4 to 8 carbon atoms in the alkyl chain. Alkyl acrylates esters include, among others, n-butyl acrylate, 2-ethyl hexyl acrylate, hexyl acrylate, decyl acrylate, dodecyl acrylate, isooctylacrylate and the like. In one embodiment, the alkyl acrylate esters are present in an amount of at least about 50% of the weight of total monomers. In one embodiment, the alkyl acrylate ester is present in the range of about 50% to about 99%, or about 55 to about 98%, or about 75% to about 90% of the weight of total monomers.

The acrylic emulsion PSA polymer comprises at least one polar comonomer. Examples of such polar monomers include carboxylic acids containing from about 3 to about 5 carbon atoms. Among the carboxylic acids are acrylic acid, methacrylic acid, maleic acid, fumaric acid, itaconic acid, and the like, and combinations of two or more thereof. Other polar comonomers containing carboxylic and hydroxy groups can also be used. Examples of such polar comonomers include beta-carboxyethyl acrylate, monomethacryloylethyl succinate, monomethacryloylethyl phthalate, polyethylene(propylene) glycol mono(meth)acrylates, 2-hydroethyl (meth)acrylate, 2-hydroxypropyl (meth)acrylates and the like, and combinations of two or more thereof. In one embodiment, the polar monomer is present in the range of about 0.5% to about 5%, or about 0.5% to about 3%, or about 1% to about 3% of the weight of total monomers.

In one embodiment, the acrylic emulsion PSA polymer also comprises at least one styrene or styrene derivative such as tertiary butyl styrene, dimethyl styrene and vinyl toluene and the like. In one embodiment, the styrene or styrene derivative is present in the range of about 1% to about 25%, or about 1% to about 15% of the weight of total monomers.

In one embodiment, the acrylic emulsion PSA also comprises at least one copolymerizable monomer chosen from methyl methacrylate, ethyl acrylate, methyl acrylate, vinyl acetate and combinations of two or more thereof. The copolymerizable monomer may be present in an amount of from 0% to about 50% based on the total weight of monomers, or about 5% to about 50%, or about 5% to about 15%.

In one embodiment, the acrylic emulsion polymer may include multifunctional ethylenically unsaturated monomers. Such monomers include, for example, divinyl benzene, trivinylbenzene, divinyltoluene, divinylpyridine, divinylnaphthalene, divinylxylene, ethyleneglycol di(meth)acrylate, trimethylolpropane tri(meth)acrylate, diethylenegrycol divinyl ether, trivinylcyclohexane, allyl (meth)acrylate, diethylene glycol di(meth)acrylate, propyleneglycol di(meth)acrylate, trimethylolpropane tri(meth)acrylate, 2,2-dimethylpropane-1,3-di(meth)acrylate, 1,3-butylene glycol di(meth)acrylate, 1,4-butanediol di(meth)acrylate, 1,6-hexanediol di(meth)acrylate, tripropylene glycol di(meth)acrylate, triethylene glycol di(meth)acrylate, polyethylene glycol di(meth)acrylates, such as polyethylene glycol 200 di(meth)acrylate and polyethylene glycol 600 di(meth)acrylate, tetraethylene glycol di(meth)acrylate, ethoxylated bisphenol A di(meth)acrylate, poly(butanediol) di(meth)acrylate, pentaerythritol tri(meth)acrylate, trimethylolpropane triethoxy tri(meth)acrylate, glyceryl propoxy tri(meth)acrylate, pentaerythritol tetra(meth)acrylate, dipentaerythritol monohydroxypenta(meth)acrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly(phenyl vinyl siloxane), and combinations of two or more thereof. In one embodiment, the optional monomer is present in the acrylic emulsion polymer in the range of 0% to about 20% by weight of the total monomers. In one embodiment, the optional copolymerizable monomer is present in an amount of about 0 to about 15% by weight of the monomers.

Other comonomers including acetoacetoxyethyl (meth)acrylate, N-vinyl caprolactam, hydroxyethyl(propyl) (meth)acrylate, and the like may be added to the monomer mix. Chemical crosslinkers may be provided in an amount of up to 1% by weight of the monomers.

The acrylic emulsion PSA polymers are formed in the presence of at least one surfactant. Useful surfactants include anionic surfactants, nonionic surfactants and mixtures thereof. In one embodiment, both anionic and ionic surfactants are used and are provided in a weight ratio of nonionic to anionic of at least about 1.5:1. In one embodiment, the surfactants are provided in a weight ratio of about 1.5:1 to about 4:1, or about 2:1 to about 3:1.

Anionic surfactants useful in the polymerization process include those containing sulfate, sulfonate, phosphate, polyoxyethylene sulfate, polyoxyethylene sulfonate, polyoxyethylene phosphate groups, and the like, and the salts of such anionic groups including alkali metal salts, ammonium salts, teritary amino salts, and the like, including salts of sulfated nonyl or octyl phenoxy poly(ethyleneoxy) ethanols, alkyl sulfonate, alkyl sulfosuccinate, polyoxyethylene alkyl sulfate, polyoxyethylene alkylaryl sulfate, polyoxyethylene alkyl phenol ether sulfate and combinations of two or more thereof. Representative commercially available anionic surfactants include lauryl ether sulfates such as Disponil™ FES-32, Disponil™ FES-993 available from Cognis Corporation; di-2-ethyl hexyl sulphosuccinate sodium salt also from Cognis Corporation; salts of sulfated nonyl and octyl phenoxy poly(ethyleneoxy) ethanols such as Aerosol™ NPES-458, Aerosol™ OT-75, Aerosol™ A-501 available from Cytec Industries; aromatic phosphate ester surfactants such as Rhodafac™ PE-510 available from Rhone Poulenc; copolymerizable surfactants such as sulfated acrylic polyethers such as SAM 211 from PPG Industries and the like. Other surfactants useful for polymerization include docecyl benzene sulfonate, lauryl sulfate, and the like.

Nonionic surfactants useful in the polymerization process include those containing modified fatty alcohol or acid ethoxylates, alkyl phenol ethoxylate, polyoxyethylene alkyl phenol ether, polyoxyethylene alkyl ether, and combinations of two or more thereof. Commercially available nonionic surfactants include modified fatty alcohol polyglycolether such as Disponil™ AFX 1080 from Cognis Corporation; octyl and nonylphenol ethoxylates such as the Igepal™ surfactants from Rhodia; and the $C_{11}$-$C_{15}$ secondary alcohol ethoxylates such as the Tergitol 15-S series from Dow.

In one embodiment, the surfactant comprises a fatty alcohol polyglycol ether containing C-12 hydrophobes and having an ethoxylation (EO) content of less than or equal to about 20 mols. In one embodiment, the EO content is less than or equal to about 10 mols.

In addition to the monomers and surfactants described above, additional ingredients, reagents, processing aids, and other components may be used in preparing the pressure sensitive adhesives. A nonlimiting list includes polymerization catalysts (initiators); electrolytes; chain transfer agents, for example, those containing mono- or multi-mercapton groups such as n-dodecyl mercaptan (n-DDM), halogenated groups, hydroxy groups and the like; base solutions (e.g., aqueous ammonia sodium hydroxide, etc.); accelerators; defoaming agents, for example, Drewplus T-1201 commercially available from Ashland Specialty Chemical Company; and biocides, for example, Kathon LX, commercially available as a 1.5% solution from Rohm & Haas. In one embodiment, the polymer comprises 0.01% to about 0.5% by weight, based on the total weight of monomers of a chain transfer agent.

Conventional water soluble free radical initiators can be used for polymerization. They include ammonium persulfate, potassium persulfate and sodium persulfate. Other initiators such as water soluble azo initiators, redox initiators such as persulfate/bisulfate catalyst systems can also be used. The typical concentration of polymerization initiator is about 0.05% to about 1.0% of the total weight of monomers.

Following polymerization, the pH of the emulsion may be adjusted by contacting the emulsion with a suitable base in an amount necessary to raise the pH of at least 7. In one embodiment, the pH is from about 7.2 to about 9, or from about 7.5 to about 8. Examples of suitable bases include alkali metal hydroxides, alkaline earth metal hydroxides, ammonium hydroxide, amines and the like.

The emulsion polymer typically has a mean "volume-average" particle diameter of greater than about 210 nm as determined by laser light scattering using a Nicomp Instrument spectrometer. In one embodiment, the emulsion polymer has a mean volume-average particle size of at least 250 nm, or about 300 nm, or about 350 nm. In one embodiment, the emulsion polymer has a bimodal particle size distribution.

In one embodiment of the invention, emulsion polymers are prepared that have a high solids content and low viscosity. The solids content of the emulsion polymer may be at least 55% by weight. In one embodiment, the solids content is about 55% to about 70% by weight. The emulsified product of polymerization may have a viscosity in the range of about 300 to about 15,000 cps. In one embodiment, the viscosity is in the range of about 300 to about 4,000 cps.

Hot Water Resistance Test:

A hot water resistance test was developed to simulate the effect of pasteurization and as a standard method to determine candidate adhesive polymer opacity. Opacity is the ration of the reflectance of a sample backed with a with a black background to that of a sample backed with a white background, multiplied by one hundred, and reported as percent opacity. In the test, a pressure sensitive adhesive is coated to a thickness of 1 mil on a clear 2 mil biaxially oriented polypropylene (BOPP) facestock or backing, dried at 60° C. in an oven for 10 min. and cooled. After cooling, the film facestock or backing is immersed in a beaker of hot water (66+° C.) for 60 min. The PSA coated facestock is then immediately laminated to a clear 2 mil polyester film with a plastic squeegee and opacity of the resultant laminate determined using a spectrocolorimeter (Hunter Labe Color-Quest 45/0). Percentage opacity for the immersed sample is compared to a sample that has not been immersed and the difference is recorded as Delta Opacity. An opacity increase of up to about 5% is regarded as good. An opacity increase of up to about 2.5% is regarded as excellent. An opacity increase above 10.0% is regarded as poor for applications requiring a non=water whitening PSA.

Cold Water Resistance Test:

A cold water resistance test was developed to simulate the effect of "ice chest" conditions and as a standard method to determine candidate adhesive polymer opacity for beverage bottle applications. The test is substantially the same as that of the hot water test, with the exception that the PSA coated facestock is immersed in a bath of water at a temperature of about 0° C. (32° F.) for a period of 72 hours before measuring the opacity with a spectrocolorimeter. An opacity increase of up to about 5% is regarded as excellent. An opacity increase greater than 10.0% is regarded as poor for applications requiring a non-water whitening PSA.

When coated on a substrate and dried, the polymers are tacky and useful in preparing adhesives, including pressure sensitive tapes, labels and other constructions. In one embodiment, a coated construction is prepared by coating the polymer emulsion on release liner, drying the emulsion, and laminating the resulting subassembly to a facestock or other substrate, such as a paper or film backing. Alternatively, the emulsion may be coated directly on a facestock, dried, and then protected until use by a release liner or a low release energy backside of the construction. In another embodiment, a coated construction is prepared by simply coating the emulsion polymer on a substrate and allowing it to dry.

EXAMPLES

Example 1

There is formed a reactor charge containing 307.2 g of deionized water. A pre-emulsion feed soap solution is formed by dissolving 42.01 g of Disponil 993 (32% solids, manufactured by Cognis Corp.), 7.26 g of Aerosol OT-75 (75% solids, manufactured by Cytec) in 120.03 g of deionized water.

A monomer mix is made up with 753.62 g of 2-ethyl hexyl acrylate, 89.75 g of methyl methacrylate, 44.88 g of styrene, and 8.97 g of acrylic acid. The monomer mix is added to the pre-emulsion solution with mixing and is stirred until the viscosity is in the range of 1000-4000 cps (Brookfield, RV, #3/12 rpm).

An aqueous initiator feed solution was prepared by dissolving 1.95 g of potassium persulfate in 77.96 g of deionized water. A kickoff initiator was prepared and comprised of 1.95 g of potassium persulfate.

The reactor charge is introduced to a 1.5-liter reactor. The reactor charge is heated to 78° C. and the kickoff initiator added. The mixture is held for 5 minutes at 78° C. The pre-emulsion feed is started at the rate of 4.637 g/min. Twenty five minutes after the start of the pre-emulsion feed, the aqueous initiator feed is added at the rate of 0.347 g/min. The pre-emulsion is added over 3.83 hours. The aqueous initiator feed is added over 3.83 hours. Throughout the feeds, the internal temperature of the reactor is maintained at 80-82° C. After the feeds are completed, the contents are held at 80° C. for an additional hour, and then cooled. The latex is neutralized with a dilute ammonium hydroxide solution to a pH of 7.5. The final latex solids are 61.95%. Viscosity is 460 cps (Brookfield, RV, #3/12 rpm). Particle size measurement yielded a bimodal distribution of which 52.1% is comprised of 185.3 nm particles and 47.9% comprised of 578.3 nm particles. When tested by the above described hot water resistance test, a delta opacity of 9.5% is measured.

Example 2

There is formed a reactor charge containing 283.81 g of deionized water. A pre-emulsion feed soap solution is formed by dissolving 17.65 g of Disponil AFX-1080 (80% solids, manufactured by Cognis Corp.), 7.45 g of Aerosol OT-75 (75% solids, manufactured by Cytec) in 106.78 g of deionized water.

A monomer mix is made up with 772.74 g of 2-ethyl hexyl acrylate, 92.03 g of methyl methacrylate, 46.01 g of styrene, and 9.20 g of acrylic acid. The monomer mix is added to the pre-emulsion solution with mixing and is stirred until the viscosity is in the range of 1000-4000 cps (Brookfield, RV, #3/12 rpm).

An aqueous initiator feed solution is prepared by dissolving 2.67 g of potassium persulfate in 118.54 g of deionized water. A kickoff initiator is prepared and comprised of 2.67 g of potassium persulfate.

The reactor charge is introduced to a 1.5-liter reactor. The reactor charge is heated to 78° C. and the kickoff initiator added. The mixture is held for five minutes at 78° C. The pre-emulsion feed is started at the rate of 4.574 g/min. Twenty-five minutes after the start of the pre-emulsion feed, the aqueous initiator feed is added at the rate of 0.527 g/min. The pre-emulsion is added over 3.83 hours. The aqueous initiator feed is added over 3.83 hours. Throughout the feeds, the internal temperature of the reactor is maintained at 80-82° C. After the feeds are complete, the contents are held at 80° C. for an additional hour and then cooled. The latex is neutralized with a dilute ammonium hydroxide solution to a pH of 7.5. The final latex solids are 62.46%. Viscosity is 1780 cps (Brookfield, RV, #3/12 rpm). Particle size measurement yielded a bimodal distribution. When tested by the above described hot water resistance test, a delta opacity of 3.75% is measured.

Example 3

There is formed a reactor charge containing 283.52 g of deionized water. A pre-emulsion feed soap solution is formed by dissolving 17.65 g of Disponil AFX-1080 (80% solids, manufactured by Cognis Corp.), 7.44 g of Aerosol OT-75 (75% solids, manufactured by Cytec) in 106.67 g of deionized water.

A monomer mix is made up with 771.95 g of 2-ethyl hexyl acrylate, 91.93 g of methyl methacrylate, 45.97 g of styrene, 9.20 g of acrylic acid, and 1.54 g of tetra ethylene glycol diacrylate (100% active manufactured by Sartomer). The monomer mix is added to the pre-emulsion solution with mixing and is stirred until the viscosity is in the range of 1000-4000 cps (Brookfield, RV, #3/12 rpm).

An aqueous initiator feed solution is prepared by dissolving 2.67 g of potassium persulfate in 118.42 g of deionized water. A kickoff initiator is prepared and comprised of 2.67 g of potassium persulfate.

The reactor charge is introduced to a 1.5-liter reactor. The reactor charge is heated to 78° C. and the kickoff initiator added. The mixture is held for 5 minutes at 78° C. The pre-emulsion feed is started at the rate of 4.576 g/min. Twenty-five minutes after the start of the pre-emulsion feed, the aqueous initiator feed is added at the rate of 0.526 g/min. The pre-emulsion is added over 3.83 hours. The aqueous initiator feed is added over 3.83 hours. Throughout the feeds, the internal temperature of the reactor is maintained at 80-82° C. After the feeds are complete, the contents are held at 80° C. for an additional hour and then cooled. The latex is neutralized with a dilute ammonium hydroxide solution to a pH of 7.5. The final latex solids is 62.5%. Viscosity is 1560 cps (Brookfield, RV, #3/12 rpm). Particle size measurements yielded a bimodal distribution. When tested by the above described hot water resistance test, a delta opacity of 6.9% is measured.

Example 4

There is formed a reactor charge containing 283.52 g of deionized water. A pre-emulsion feed soap solution is formed by dissolving 22.06 g of Igepal CO-887 (70% solids, manufactured by Rhodia), 7.44 g of Aerosol OT-75 (75% solids, manufactured by Cytec) in 106.67 g of deionized water.

A monomer mix is made up with 771.95 g of 2-ethyl hexyl acrylate, 91.93 g of methyl methacrylate, 45.97 g of styrene, and 9.20 g of acrylic acid. The monomer mix is added to the pre-emulsion solution with mixing and is stirred until the viscosity is in the range of 1000-4000 cps (Brookfield, RV, #3/12 rpm).

An aqueous initiator feed solution is prepared by dissolving 2.67 g of potassium persulfate in 118.42 g of deionized water. A kickoff initiator is prepared and comprised of 2.67 g of potassium persulfate.

The reactor charge is introduced to a 1.5-liter reactor. The reactor charge is heated to 78° C. and the kickoff initiator added. The mixture is held for five minutes at 78° C. The pre-emulsion feed is started at the rate of 4.576-g/min. Twenty-five minutes after the start of the pre-emulsion feed, the aqueous initiator feed is added at the rate of 0.526 g/min. The pre-emulsion is added over 3.83 hours. The aqueous initiator feed is added over 3.83 hours. Throughout the feeds, the internal temperature of the reactor is maintained at 80-82° C. After the feeds are complete, the contents are held at 80° C. for an additional hour and then cooled. The latex is neutralized with a dilute ammonium hydroxide solution to a pH of 7.5. The final latex solids are 62.39%. Viscosity is 1340 cps (Brookfield, RV, #3/12 rpm). Particle size measurements yielded a bimodal distribution. When tested by the above described hot water resistance test, a delta opacity of 6.9% is measured.

Example 5

There is formed a reactor charge containing 283.52 g of deionized water. A pre-emulsion feed soap solution is formed by dissolving 23.09 of Disponil AFX-1080 (80% solids, manufactured by Cognis Corp.), in 117.4 g of deionized water.

A monomer mix is made up with 773.95 g of 2-ethyl hexyl acrylate, 91.93 g of methyl methacrylate, 45.97 g of styrene, and 9.20 g of acrylic acid. The monomer mix is added to the pre-emulsion solution with mixing and is stirred until the viscosity is in the range of 1000-4000 cps (Brookfield, RV, #3/12 rpm).

An aqueous initiator feed solution is prepared by dissolving 2.67 g of potassium persulfate in 118.42 g of deionized water. A kickoff initiator was prepared and comprised of 2.67 g of potassium persulfate.

The reactor charge is introduced to a 1.5-liter reactor. The reactor charge is heated to 78° C. and the kickoff initiator added. The mixture is held for five minutes at 78° C. The pre-emulsion feed is started at the rate of 4.576 g/min. Twenty five minutes after the start of the pre-emulsion feed, the aqueous initiator feed is added at the rate of 0.526 g/min. The pre-emulsion is added over 3.83 hours. The aqueous initiator feed is added over 3.83 hours. Throughout the feeds, the internal temperature of the reactor is maintained at 80-82° C. After the feeds are complete, the contents are held at 80° C. for an additional hour and then cooled. The latex is neutralized with a dilute ammonium hydroxide solution to a pH of 7.5. The final latex solids are 62.5%. Viscosity is 1050 cps (Brookfield, RV, #3/12 rpm) Particle size yielded a bimodal distribution. When tested by the above described hot water resistance test, a delta opacity of 8.35% is measured.

Example 6

There is formed a reactor charge containing 283.81 g of deionized water. A pre-emulsion feed soap solution is formed by dissolving 17.65 g of Disponil AFX-1080 (80% solids, manufactured by Cognis Corp.), 7.45 g of Aerosol OT-75 (75% solids, manufactured by Cytec) in 116.78 g of deionized water.

A monomer mix is made up with 772.74 g of 2-ethyl hexyl acrylate, 92.03 g of methyl methacrylate, 46.01 g of styrene, and 9.20 g of acrylic acid.

The monomer mix is added to the pre-emulsion solution with mixing and is stirred until the viscosity is in the range of 1000-4000 cps (Brookfield, RV, #3/12 rpm).

An aqueous initiator feed solution is prepared by dissolving 2.26 g of ammonium persulfate in 118.54 g of deionized water. A kickoff initiator is prepared comprising of 2.26 g of potassium persulfate. The reactor charge is introduced to a 1.5-liter reactor. The reactor charge is heated to 78° C. and the kickoff initiator added. The mixture is held for five minutes at 78° C. The pre-emulsion feed is started at the rate of 4.574 g/min. Twenty five minutes after the start of the pre-emulsion feed, the aqueous initiator feed is added at the rate of 0.527 g/min. The pre-emulsion is added over 3.83 hours. The aqueous initiator feed is added over 3.83 hours. Throughout the feeds, the internal temperature of the reactor is maintained at 80-82° C. After the feeds are complete, the contents are held at 80° C. for an additional hour and then cooled. The latex is neutralized with a dilute ammonium hydroxide solution to a pH of 7.5. The final latex solids are 62.46%. Viscosity is 1120 cps (Brookfield, RV, #3/12 rpm) and particle size yielded a bimodal distribution. When tested by the above described hot water resistance test, a delta opacity of 2.85% is measured.

Example 7

There is formed a reactor charge containing 40.0 g of 100 nm emulsion polymer (commonly known as a seed or pre-form seed) in 185.0 g of deionized water. A pre-emulsion feed soap solution is formed by dissolving 15.34 g of Disponil AFX-1080 (80% solids, manufactured by Cognis), and 6.48 g of Aerosol OT-75 (75% solids) in 120.0 g of deionized water. A monomer mix is made up with 669.38 g 2-ethylhexyl acrylate (2-EHA), 79.69 g methyl methacrylate (MMA), 39.84 g of styrene, and 7.97 g of acrylic acid (AA). The monomer mix is added to the pre-emulsion soap solution with mixing and is stirred until the viscosity is approximately 2000 cps (Brookfield, RV, #3 12 rpm). A cofeed solution is prepared by dissolving 3.19 g of potassium persulfate in 156.0 g of deionized water. An initial kickoff initiator solution is prepared by dissolving 1.43 g of potassium persulfate in 47.5 g of deionized water. The reactor charge is added to a 1.5 liter jacketed reactor that has been flushed with nitrogen. The reactor charge is held at 82° C. and the kickoff initiator solution added. The mixture is held for five minutes at 80° C. The pre-emulsion feed is started at a rate of 4.0 g/min. After twenty-five minutes, the initiator cofeed is started at a rate of 0.69 g/min. The pre-emulsion is fed over a period of four hours. During the feeds, the temperature inside the reactor is maintained at approximately 80° C. After all of the feeds are complete, the contents are held at approximately 80° C. for one hour and then cooled. The latex is neutralized with dilute ammonium hydroxide to a pH of 7.0. The final latex solids are 58.3%. The viscosity is 400 cps (Brookfield RV #4 at 20 rpm). The average particle diameter is 383 nm. When tested by the above described hot water immersion test, a delta opacity of 3.8% is measured.

Comparative Example 8

There is formed a reactor charge containing 5.4 g of Disponil AFX-1080 (80% solids, manufactured by Cognis), 2.24 g of Aerosol OT-75 (75% solids) in 450.0 g of deionized water. A pre-emulsion feed soap solution is formed by dissolving 5.4 g of Disponil AFX-1080 (80% solids, manufactured by Cognis), and 2.24 g of Aerosol OT-75 (75% solids) in 120.0 g of deionized water. A monomer mix is made up with 504.0 g 2-EHA, 60.0 g MMA, 30.0 g of styrene, and 6.0 g of M. The monomer mix is added to the pre-emulsion soap solution with mixing and is stirred until the viscosity is approximately 2000 cps (Brookfield, RV, 3 #12). The reactor charge is added to a 1.5 liter jacketed reactor that is flushed with nitrogen. The reactor charge is held at 82° C. and 3.8 g of potassium persulfate is added. The mixture is held for five minutes at 80° C. The pre-emulsion feed is started at a rate of 8.1 g/min. The pre-emulsion is fed over a period of one and one half-hours. During the feeds, the temperature inside the reactor is maintained at approximately 80° C. After all of the feeds are complete, the contents are held at approximately 80° C. for one hour and then cooled. The latex is neutralized with dilute ammonium hydroxide to a pH of 7.0. The final latex solids are 50.1%. The viscosity is 800 cps (Brookfield RV, #4 at 20 rpm). The average particle diameter is 154 nm. When tested by the above described hot water resistance test, a delta opacity of 22.2% is measured.

Examples 9 and 10

Figure 1:
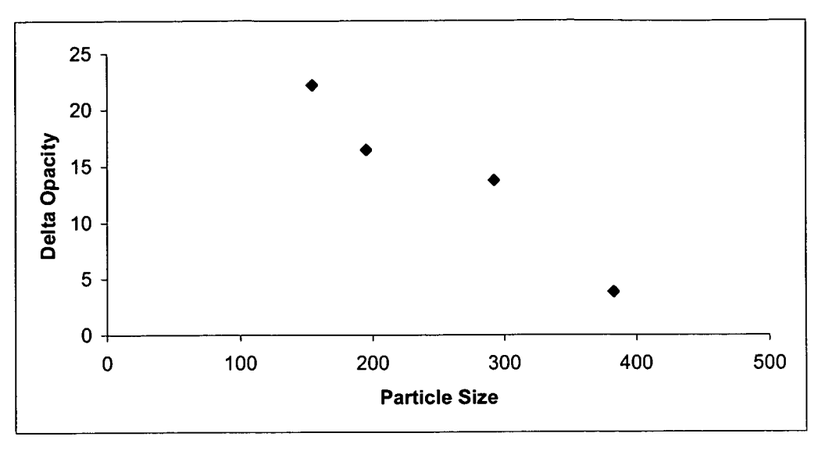
FIG. 1 graph showing the polymer particle size versus the water resistance of acrylic emulsion PSAs.

Examples 9 and 10 are prepared substantially in accordance with the procedure of Example 7, with the exception that the seed amount was increased to result in a smaller average particle size. FIG. 1 is a graph of the data presented in Table 1 below.

TABLE 1

| Example | Particle Size (nm) | Delta Opacity |
|---------|---------------------|---------------|
| 7 | 383 | 3.8 |
| 8 | 154 | 22.2 |
| 9 | 292 | 13.8 |
| 10 | 195 | 16.5 |

Example 11

There is formed a reactor charge containing 41.92 g of 100 nm emulsion polymer (commonly known as a seed or pre-form seed) in 183.4 g of deionized water. A pre-emulsion feed soap solution is formed by dissolving 16.08 g of Disponil AFX-1080 (80% solids, manufactured by Cognis), and 6.79 g of Aerosol OT-75 (75% solids) in deionized water. A monomer mix is made up with 701.52 2-EHA, 83.52 g MMA, 41.75 g of styrene, and 8.16 of M. The monomer mix is added to the pre-emulsion soap solution with mixing and is stirred until the viscosity is approximately 1000-4000 cps (Brookfield, RV, 3 #12). A cofeed solution is prepared by dissolving 3.34 g of potassium persulfate in 163.49 g of deionized water. An initial kickoff initiator solution is prepared by dissolving 1.50 g of potassium in 52.4 g of deionized water. The reactor charge is added to a 2.0 liter jacketed reactor that has been flushed with nitrogen. The reactor charge is held at 82° C. and the kickoff initiator solution added. The mixture is held for five minutes at 80° C. The pre-emulsion feed is started at a rate of 2.9 g/min. After twenty-five minutes, the initiator cofeed is started at a rate of 0.47 g/min. The pre-emulsion is fed over a period of 5.83 hours. During the feeds, the temperature inside the reactor is maintained at approximately 80° C. After all of the feeds are complete, the contents are held at approximately 80° C. for one hour and then cooled. The latex is neutralized with dilute ammonium hydroxide to a pH of 7.5. The final latex solids are 58.3%. The viscosity are 780 cps (Brookfield RV, #4, rpm20). The average particle diameter is 385 nm. When tested by the above described hot water resistance test, a delta opacity of 0.52% is measured.

Other samples, A-I, are made of varying acrylic acid (AA), styrene (Sty), and methyl methacrylate (MMA) levels by the procedure method described in Example 11. Shown below in Table 2 is data detailing the influence of AA, styrene, and MMA on delta opacity after hot water immersion.

TABLE 2

| Sample | 2-EHA | AA | Sty | MMA | Delta Opacity |
|---|---|---|---|---|---|
| A | 83 | 2 | 5 | 10 | 7.35 |
| B | 84 | 1 | 10 | 5 | 0.29 |
| C | 83 | 2 | 10 | 5 | 5.68 |
| D | 84 | 1 | 15 | 0 | 2.13 |
| E | 83 | 2 | 15 | 0 | 2.03 |
| F | 79 | 1 | 20 | 0 | — |
| G | 74 | 1 | 25 | 0 | — |
| H | 78 | 2 | 15 | 5 | — |
| I | 79 | 1 | 10 | 10 | — |

Example 12

There is formed a reactor charge containing 11.33 of 70 nm emulsion polymer (commonly known as a seed or pre-form seed) in 226.59 g of deionized water. A pre-emulsion feed soap solution is formed by dissolving 13.20 g of Disponil AFX-1080 (80% solids, manufactured by Cognis), and 5.55 g of Aerosol OT-75 (75% solids) in deionized water. A monomer mix is made up with 758.39 g 2-EHA, 45.14 g MMA, 90.29 g of styrene, 8.83 g of AA, and 2.27 g of tetra ethylene glycol diacrylate. The monomer mix is added to the pre-emulsion soap solution with mixing and is stirred until the viscosity is approximately 1000-4000 cps (Brookfield, RV, 3 #12). A cofeed solution is prepared by dissolving 3.05 g of ammonium persulfate in 107.63 g of deionized water. An initial kickoff initiator solution is prepared by dissolving 1.37 g of ammonium persulfate in 28.32 g of deionized water. The reactor charge is added to a 2.0 liter jacketed reactor that has been flushed with nitrogen. The reactor charge is held at 82° C. and the kickoff initiator solution added. The mixture is held for five minutes at 80° C. The pre-emulsion feed is started at a rate of 3.09 g/min. After five minutes, the initiator cofeed is started at a rate of 0.299 g/min. The pre-emulsion is fed over a period of 5.83 hours. During the feeds, the temperature inside the reactor is maintained at approximately 80° C. After all of the feeds are complete, the contents are held at approximately 80° C. for one hour and then cooled. The latex is neutralized with dilute ammonium hydroxide to a pH of 7.5. The final latex solids are 61.5%. The viscosity is 3200 cps (Brookfield RV, #3/12). The average particle diameter is 385 nm. When tested by the above described hot water resistance test, a delta opacity of 3.21% is measured.

Example 13

There is formed a reactor charge containing 10.73 g of 70 nm emulsion polymer (commonly known as a seed or pre-form seed) in 225.37 g of deionized water. A pre-emulsion feed soap solution is formed by dissolving 12.5 g of Disponil AFX-1080 (80% solids, manufactured by Cognis), and 5.25 g of Aerosol OT-75 (75% solids) in 171.69 g in deionized water. A monomer mix is made up with 719.56 g 2-EHA, 128.5 g MMA, 8.57 g of AA, and 3.51 g n-dodecyl mercaptan (nDDM). The monomer mix is added to the pre-emulsion soap solution with mixing and is stirred until the viscosity is approximately 2000 cps (Brookfield, RV, 3 #12). A cofeed solution is prepared by dissolving 2.89 g of ammonium persulfate in 167.4 g of deionized water. An initial kickoff initiator solution is prepared by dissolving 1.3 g of potassium in 26.83 g of deionized water. The reactor charge is added to a 2.0 liter jacketed reactor that has been flushed with nitrogen. The reactor charge is held at 82° C. and the kickoff initiator solution added. The mixture is held for five minutes at 82° C. The pre-emulsion feed is started at a rate of 5.81 g/min. After five minutes, the initiator cofeed is started at a rate of 0.895 g/min. The pre-emulsion is fed over a period of five hours and fifty minutes. During the feeds, the temperature inside the reactor is maintained at approximately 82° C. After all of the feeds are complete, the contents are held at approximately 82° C. for one hour and then cooled. The latex is neutralized with dilute ammonium hydroxide to a pH of 7.0. The final latex solids are 58.5% and the delta opacity is 2.1%.

Example 14

There is formed a reactor charge containing 10.73 g of 70 nm emulsion polymer (commonly known as a seed or pre-form seed) and 0.04 g of $Fe^{2+}$ EDTA in 225.37 g of deionized water. A pre-emulsion feed soap solution is formed by dissolving 12.5 g of Disponil AFX-1080 (80% solids, manufactured by Cognis), 5.25 g of Aerosol OT-75 (75% solids), and 0.86 g of Bruggeman FF-6 in 171.69 g in deionized water. A monomer mix is made up with 719.56 g 2-EHA, 128.5 g MMA, 1.76 g nDDM and 8.57 g of M. The monomer mix is added to the pre-emulsion soap solution with mixing and is stirred until the viscosity is approximately 2000 cps (Brookfield, RV, 3 #12). A cofeed solution is prepared by dissolving 6.85 g of ammonium persulfate in 167.4 g of deionized water. The reactor charge is added to a 2.0 liter jacketed reactor that has been flushed with nitrogen. The reactor charge is held at 40° C. and the cofeed solution is begun at 0.85 g/min. Simultaneously, the pre-emulsion feed is started at a rate of 5.81 g/min. The pre-emulsion is fed over a period of five hours and fifty minutes. During the feeds, the temperature inside the reactor is maintained at approximately 40° C. After all of the feeds are complete, the contents are held at approximately 40° C. for one half-hour and then cooled. The latex is neutralized with dilute ammonium hydroxide to a pH of 7.0. The final latex solids are 60.1%.

Example 15

There is formed a reactor charge containing 10.73 g of 70 nm emulsion polymer (commonly known as a seed or pre-form seed) and 0.04 g of $Fe^{2+}$ EDTA in 225.37 g of deionized water. A pre-emulsion feed soap solution is formed by dissolving 12.5 g of Disponil AFX-1080 (80% solids, manufactured by Cognis), 5.25 g of Aerosol OT-75 (75% solids), and 0.86 g of Bruggeman FF-6 in 171.69 g of deionized water. A monomer mix is made up with 719.56 g 2-EHA, 85.66 g MMA, 42.83 g styrene, and 8.57 g of AA. The monomer mix is added to the pre-emulsion soap solution with mixing and is stirred until the viscosity is approximately 2000 cps (Brookfield, RV, 3 #12). A cofeed solution is prepared by dissolving 6.85 g of ammonium persulfate in 167.4 g of deionized water. The reactor charge is added to a 2.0 liter jacketed reactor that has been flushed with nitrogen. The reactor charge is held at 40° C. and the cofeed solution is begun at 0.85 g/min. Simultaneously, the pre-emulsion feed is started at a rate of 5.81 g/min. The pre-emulsion is fed over a period of five hours and fifty minutes. During the feeds, the temperature inside the reactor is maintained at approximately 40° C. After all of the feeds are complete, the contents are held at approximately 40° C. for one half-hour and then cooled. The latex is neutralized with dilute ammonium hydroxide to a pH of 7.0. The final latex solids are 60.1%.

Example 16

A reactor charge containing 4.33 g or potassium persulphate inn 511.50 g deionized water is formed. A pre-emulsion feed soap solution is formed by dissolving 69.95 g of Disponil FES0993 and 12.09 g Hydropalat 875 in 199.86 g of deionized water. A monomer mix is made up with 1254.80 g 2-EHA, 149.44 g MMA, 74.72 g styrene and 14.94 g acrylic acid. To the monomer mix is added 0.26 g n-dodecyl mercaptan. The monomer mix is added to the pre-emulsion soap solution with mixing. An initiator feed is prepared by dissolving 129.81 g of ammonium persulfate in 129.81 g deionized water. The reactor charge is added to a jacketed reactor that has been flushed with nitrogen. The reactor charge is held at 78° C. and the pre-emulsion feed is begun at 6.5 g/min. After about 25 minutes, the initiator feed is begun at 0.6 g/min. After the feeds are complete, the contents are held at approximately 78-81° C. for one hour, and then cooled. The latex is neutralized with 19.39 g of a 12% ammonium hydroxide solution. A biocide, Acticide LA, is added in an amount of 2.33 g when the latex has cooled to below 38° C.

In use, the pressure sensitive adhesives of the invention may be employed as part of a label laminate or facestock and PSA provided as a self wound tape or label. In one embodiment, the acrylic emulsion PSA is applied to a transparent polymeric facestock to form a clear label. The polymeric facestock may be a polyolefin, polyester, polyvinyl chloride, polycarbonate film or a multilayer construction comprising layers of the same or different polymers. The multilayer films may be coextruded films. Examples of commercially available multilayer films include FasClear® film and Primax® film from Avery Dennison Corp. The label may comprise a release liner adhered to the acrylic emulsion PSA. The tapes or labels may be applied to clear substrates such as glass or plastic bottles and containers and the like.

In one embodiment, the label comprises a 2 mil clear biaxially oriented polypropylene (BOPP) facestock with an adhesive layer adhered thereto. A 1 mil polyethylene terephthalate (PET) release liner may be adhered to the surface of the adhesive layer opposite to the facestock. The adhesive layer may be applied directly to the facestock, or can be coated onto the release liner and then laminated to the facestock.

While the invention has been explained in relation to its preferred embodiments, it is to be understood that various modifications thereof will become apparent to those skilled in the art upon reading the specification. Therefore, it is to be under stood that the invention disclosed herein is intended to cover such modifications as fall within the scope of the appended claims.

What is claimed is:

1. A water resistant acrylic pressure sensitive adhesive polymer formed by polymerizing in emulsion a mixture of monomers comprising
   at least one alkyl acrylate ester of an alcohol containing 4 to 8 carbon atoms in the alkyl chain;
   at least one polar monomer; and
   at least one copolymerizable monomer,
   wherein the pressure sensitive adhesive polymer as an emulsion polymer has a volume average particle diameter of at least 300 nm as determined by laser light scattering and wherein the pressure sensitive adhesive polymer, when coated and dried to a thickness of up to 1 mil on a clear 2 mil biaxially oriented polypropylene (BOPP) facestock or backing and immersed in water of at least 66° C. for 60 minutes, and then laminated to a clear polyester film of up to 2 mil thickness, exhibits an increase in opacity of less than about 10% as determined with a spectrocolorimeter.

2. The water resistant acrylic polymer of claim 1 wherein the polar monomer comprises a carboxyl group-containing monomer, a hydroxyl group-containing monomer or combinations thereof.

3. The water resistant acrylic polymer of claim 1 wherein the polar monomer comprises a carboxylic acid containing 3 to 5 carbon atoms.

4. The water resistant acrylic polymer of claim 1 wherein the polar monomer is chosen from acrylic acid, methacrylic acid, maleic acid, fumaric acid, itaconic acid and combinations of two or more thereof.

5. The water resistant acrylic polymer of claim 1 wherein the polar monomer is chosen from beta-carboxyethyl acrylate, monomethacryloylethyl succinate, monomethacryloylethyl phthalate, polyethylene glycol monoacrylate, polypropylene glycol monoacrylate, 2-hydroxyethyl methacrylate, 2-hydroxypropyl methacrylate, 2-hydroxyethyl acrylate, 2-hydroxypropyl acrylate and combinations or two or more thereof.

6. The water resistant acrylic polymer of claim 1 wherein the alkyl acrylate ester of an alcohol comprises 2-ethylhexyl acrylate.

7. The water resistant acrylic polymer of claim 1 wherein the copolymerizable monomer comprises at least one styrene or styrene derivative monomer.

8. The water resistant acrylic polymer of claim 7 further comprising methyl methacrylate comonomer.

9. The water resistant acrylic polymer of claim 7 wherein the styrene or styrene derivative is chosen from styrene, tertiary butyl styrene, dimethyl styrene, vinyl toluene and combinations of two or more thereof.

10. The water resistant acrylic polymer of claim 1 wherein the copolymerizable monomer is chosen from methyl methacrylate, ethyl acrylate, methyl acrylate, vinyl acetate and combinations of two or more thereof.

11. The water resistant acrylic polymer of claim 10 wherein the chain transfer agent comprises n-dodecyl mercaptan.

12. The water resistant acrylic polymer of claim 1 wherein polymerization is carried out in the presence of at least one nonionic surfactant.

13. The water resistant acrylic polymer of claim 1 wherein polymerization is carried out in the presence of at least one anionic surfactant.

14. The water resistant acrylic polymer of claim 12 wherein polymerization is further carried out in the presence of at least one anionic surfactant, wherein the weight ratio of nonionic surfactant to anionic surfactant is about 1.5:1 to about 4:1.

15. The water resistant acrylic polymer of claim 12 wherein the nonionic surfactant is chosen from modified fatty alcohol or acid ethoxylate, alkyl phenol ethoxylate, polyoxyethylene alkyl phenol ether, polyoxyethylene alkyl ether, and combinations of two or more thereof.

16. The water resistant acrylic polymer of claim 13 wherein the anionic surfactant is chosen from salts of sulfated nonyl or octyl phenoxy poly(ethyleneoxy) ethanols, alkyl sulfonate, alkyl sulfosuccinate, polyoxyethylene alkyl sulfate, polyoxyethylene alkylaryl sulfate, polyoxyethylene alkyl phenol ether sulfate and combinations of two or more thereof.

17. The water resistant acrylic polymer of claim 1 wherein the solids content of the emulsion is at least about 55% by weight.

18. The water resistant acrylic polymer of claim 1 wherein the solids content of the emulsion is about 55% to about 70% by weight.

19. The water resistant acrylic polymer of claim 1 wherein the polymer is formed in the presence of at least one water soluble initiator.

20. The water resistant acrylic polymer of claim 19 wherein the initiator is chosen from ammonium persulfate, potassium persulfate, sodium persulfate, azo initiators and combinations of two or more thereof.

21. The water resistant acrylic polymer of claim 7 wherein the mixture of monomers further comprises at least one monomer chosen from methyl methacrylate, ethyl acrylate, methyl acrylate, vinyl acetate and combinations of two or more thereof.

22. The water resistant acrylic polymer of claim 1 wherein the polymer exhibits an opacity increase of less than about 3% as determined by the Hot Water Resistance Test.

23. A water resistant acrylic pressure sensitive adhesive polymer formed by polymerizing in emulsion a mixture of monomers comprising
about 55% to about 98% by weight based on the total weight of monomers of at least one alkyl acrylate ester of an alcohol containing 4 to 8 carbon atoms in the alkyl chain;
about 0.5% to about 5% by weight based on the total weight of monomers of at least one polar monomer; and
about 1% to about 25% by weight based on the total weight of monomers of at least one styrene or styrene derivative copolymerizable monomer,
wherein the pressure sensitive adhesive polymer as an emulsion polymer has a volume average particle diameter of at least 300 nm as determined by laser light scattering and wherein the pressure sensitive adhesive polymer, when coated and dried to a thickness of up to 1 mil on a clear 2 mil biaxially oriented polypropylene (BOPP) facestock or backing and immersed in water of at least 66° C. for 60 minutes, and then laminated to a clear polyester film of up to 2 mil thickness, exhibits an opacity increase of less than about 10% as determined with a spectrocolorimeter.

24. A water resistant acrylic pressure sensitive adhesive polymer formed by polymerizing in emulsion a mixture of monomers comprising
about 50% to about 99% by weight based on the total weight of monomers of at least one alkyl acrylate ester of an alcohol containing 4 to 8 carbon atoms in the alkyl chain;
about 0.5% to about 3% by weight based on the total weight of monomers of at least one polar monomer;
about 5% to about 50% by weight based on the total weight of monomers of at least one copolymerizable monomer selected from methyl methacrylate, ethyl acrylate, methyl acrylate, vinyl acetate, and combinations of two or more thereof,
about 0.01% to about 0.5% by weight of a chain transfer agent;
wherein the pressure sensitive adhesive polymer as an emulsion polymer has a volume average particle diameter of at least 300 nm as determined by laser light scattering and wherein the pressure sensitive adhesive polymer, when coated and dried to a thickness of up to 1 rail on a clear 2 mil biaxially oriented polypropylene (BOPP) facestock or backing and immersed in water of at least 66° C. for 60 minutes, and then laminated to a clear polyester film of up to 2 mil thickness, exhibits an opacity increase of less than about 10% as determined with a spectrocolorimeter.

25. A water resistant acrylic pressure sensitive adhesive polymer formed by polymerizing in emulsion a mixture of monomers comprising
about 75% to about 90% by weight based on the total weight of monomers of at least one alkyl acrylate ester of an alcohol containing 4 to 8 carbon atoms in the alkyl chain;
about 1.0% to about 3% by weight based on the total weight of monomers of at least one polar monomer;
about 1% to about 15% by weight based on the total weight of monomers of at least one styrene or styrene derivative copolymerizable monomer;
about 0% to about 20% by weight based on the total weight of monomers of at least one copolymerizable monomer chosen from methyl methacrylate, ethyl acrylate, methyl acrylate, vinyl acetate and combinations of two or more thereof;
wherein the pressure sensitive adhesive polymer as an emulsion polymer has a volume average particle diameter of at least 300 nm as determined by laser light scattering and wherein the pressure sensitive adhesive polymer, when coated and dried to a thickness of up to 1 rail on a clear 2 mil biaxially oriented polypropylene (BOPP) facestock or backing and immersed in water of at least 66° C. for 60 minutes, and then laminated to a clear polyester film of up to 2 mil thickness, exhibits an opacity increase of less than about 10% as determined with a spectrocolorimeter.

26. A label comprising a facestock and a pressure sensitive adhesive comprising the water resistant acrylic polymer of claim 1.

27. A label comprising a facestock and a pressure sensitive adhesive comprising the water resistant acrylic polymer of claim 23.

28. A label comprising a facestock and a pressure sensitive adhesive comprising the water resistant acrylic polymer of claim 24.

29. A label comprising a facestock and a pressure sensitive adhesive comprising the water resistant acrylic polymer of claim 25.

30. The water resistant acrylic polymer of claim 1 wherein the polymer exhibits an opacity increase of less than about 10% as determined by the Cold Water Resistance Test.

31. A water resistant acrylic pressure sensitive adhesive polymer formed by polymerizing in emulsion a mixture of monomers comprising
    at least one alkyl acrylate ester of an alcohol containing 4 to 8 carbon atoms in the alkyl chain;
    at least one polar monomer;
    at least one copolymerizable monomer selected from styrene and styrene derivative monomers; and
    at least one copolymerizable monomer selected from methyl methacrylate, ethyl acrylate, methyl acrylate, vinyl acetate, and combinations of two or more thereof,
    wherein the pressure sensitive adhesive polymer as an emulsion polymer has a volume average particle diameter of at least 300 nm as determined by laser light scattering and wherein the pressure sensitive adhesive polymer, when coated and dried to a thickness of up to 1 mil on a clear 2 mil biaxially oriented polypropylene (BOPP) facestock or backing and immersed in water of at least 66° C. for 60 minutes, and then laminated to a clear polyester film of up to 2 mil thickness, exhibits an increase in opacity of less than about 10% as determined with a spectrocolorimeter.

32. The water resistant acrylic polymer of claim 31 further comprising a chain transfer agent.

33. The water resistant acrylic polymer of claim 1 wherein the copolymerizable monomer is selected from styrene, styrene derivative monomers, methyl methacrylate, ethyl acrylate, methyl acrylate, vinyl acetate, and combinations of two or more thereof, wherein when the monomer is methyl methacrylate, ethyl acrylate, methyl acrylate, or vinyl acetate, then it is used with a chain transfer agent.

* * * * *